US009329378B2

(12) United States Patent
Hogan (10) Patent No.: US 9,329,378 B2
(45) Date of Patent: May 3, 2016

(54) PHOTONIC MODULATOR AND SWITCH

(71) Applicant: Joshua Noel Hogan, Los Altos, CA (US)

(72) Inventor: Joshua Noel Hogan, Los Altos, CA (US)

(\*) Notice: Subject to any disclaimer, the term of this patent is extended or adjusted under 35 U.S.C. 154(b) by 0 days.

(21) Appl. No.: 14/014,257

(22) Filed: Aug. 29, 2013

(65) Prior Publication Data

US 2014/0079081 A1    Mar. 20, 2014

Related U.S. Application Data

(60) Provisional application No. 61/694,765, filed on Aug. 30, 2012.

(51) Int. Cl.
| | |
|---|---|
| *G02B 26/00* | (2006.01) |
| *G02B 26/08* | (2006.01) |
| *H01S 3/11* | (2006.01) |
| *G02B 5/18* | (2006.01) |
| *G02B 27/28* | (2006.01) |
| *G02B 27/42* | (2006.01) |
| *H01S 3/105* | (2006.01) |
| *G02F 1/01* | (2006.01) |
| *H01S 3/08* | (2006.01) |
| *H01S 3/10* | (2006.01) |

(52) U.S. Cl.
CPC ............. *G02B 26/00* (2013.01); *G02B 5/1828* (2013.01); *G02B 26/0808* (2013.01); *G02B 27/286* (2013.01); *G02B 27/4261* (2013.01); *G02F 1/0136* (2013.01); *H01S 3/105* (2013.01); *H01S 3/1106* (2013.01); *H01S 3/1109* (2013.01); *G02F 2201/307* (2013.01); *G02F 2202/16* (2013.01); *H01S 3/08054* (2013.01); *H01S 3/10061* (2013.01)

(58) Field of Classification Search
CPC ..... H01S 3/105; H01S 3/1109; H01S 3/1106; H01S 3/08054; H01S 3/10061; G02B 5/1828; G02B 27/286; G02B 26/00; G02B 26/0808; G02B 27/4261; G02F 2202/16; G02F 2201/307; G02F 1/0136
See application file for complete search history.

(56) References Cited

U.S. PATENT DOCUMENTS

| | | | | |
|---|---|---|---|---|
| 4,245,883 A | \* | 1/1981 | Johnson et al. | ................. 385/17 |
| 8,018,648 B1 | \* | 9/2011 | Cook et al. | .................... 359/342 |
| 2003/0128726 A1 | \* | 7/2003 | Tatsuno et al. | ................. 372/36 |
| 2004/0234267 A1 | \* | 11/2004 | Tsao et al. | ...................... 398/83 |
| 2006/0120412 A1 | \* | 6/2006 | Liu | ................................ 372/6 |
| 2008/0049328 A1 | \* | 2/2008 | Zhou | ............................ 359/566 |

\* cited by examiner

*Primary Examiner* — Xinning Niu (57) ABSTRACT

The invention taught herein provides a method, device and system for modulating or switching electromagnetic radiation by controlling a state of the radiation, such as a polarization state. Radiation is directed at a reflective or transmissive structure, such that the radiation is incident on the structure. The structure includes a property that can be dynamically switched between two configurations, one of which is asymmetric and is configured to modify the polarization characteristic of the radiation. The dynamically configurable structure can be combined with polarization components to achieve modulation. Embodiments suitable for mode-locking a laser and for cavity dumping a mode-locked laser are also disclosed.

10 Claims, 9 Drawing Sheets

Control relative phase by design of birefringence of material

PHOTONIC MODULATOR AND SWITCH

RELATED APPLICATIONS

This U.S. patent application Ser. No. 14/014,257, claims priority from provisional patent application 61/694,765 which was filed on Aug. 30, 2012.

FIELD OF THE INVENTION

This U.S. patent application relates to switching electromagnetic radiation between at least two states. More generally it relates to modulating electromagnetic radiation. Modulating or switching electromagnetic radiation and in particular optical signals has applications in multiple fields including, but not limited to, optical communications; optical data storage; optical imaging and analysis; generation of a train of optical pulses; and extracting a single optical pulse.

BACKGROUND OF THE INVENTION

Modulating electromagnetic radiation, and in particular switching optical signals between two or more intensities or phases is used to encode information on an optical signal for purposes such as communication or storage of information. The amount of information that can be encoded is related to the rate or frequency at which modulation can be performed.

At relatively low modulation rates, optical modulation can be performed by, for example, modulating the current to a laser diode. Modulating the current to turn the laser diode on or off is often referred to as on-off keying (OOK). Such on-off current modulation generates an intensity modulated optical signal.

To achieve intensity modulation at very high modulation rates a common technique is to separate the optical signal into two components, phase modulate at least one component such that a 180 degree relative phase shift can be introduced between the two components which are then recombined. Modulating the phase in this manner results in an intensity modulated optical signal, as in a conventional Mach Zehnder modulator.

Another conventional technique for modulating or switching an optical signal is to use a Pockels cell, which is a voltage controlled wave-plate based on the electro-optic effect. A Pockels cell is typically combined with a polarizer and can switch the plane of polarization of an optical signal between zero optical rotation and 90° rotation at high speeds. Such a rotation enables redirecting the optical signal by means of a polarized beam splitter.

Operation of a Mach Zehnder modulator or a Pockels cell modulator depends on weak bulk material effects of the phase modulating material of the Mach Zehnder modulator and the voltage controlled wave-plate material of the Pockels cell. The requirement of modifying bulk properties of a material to achieve modulation has speed limiting consequences and places a significant burden on the manufacturing and operation of these devices, requiring a Mach Zehnder modulator to be physically long and requiring high voltage for operation of a Pockels cell modulator. These burdens have negative physical size and cost consequences.

There is therefore an unmet need for a method, apparatus and system for high speed a optical modulator or switch that is not limited by speed limitations of bulk material based modulators and is not limited by the physical size and cost issues of bulk material based modulators.

SUMMARY OF THE INVENTION

The invention taught herein provides a method, device and system for modulating or switching electromagnetic radiation by controlling a polarization characteristic of the radiation, by directing the radiation at a reflective or transmissive structure, such that the radiation is incident on the structure. The structure includes a property that can be dynamically switched between two configurations, one of which is asymmetric and is designed to modify the polarization characteristic of the radiation. The dynamically configurable structure can be combined with polarization components to achieve modulation. An embodiment suitable for mode-locking a laser is also disclosed. An embodiment suitable for cavity dumping a mode-locked laser is also disclosed.

DETAILED DESCRIPTION OF THE INVENTION

A preferred embodiment of this invention is illustrated in and described with reference to FIG. 1A (of FIG. 1 Sheet 1). The preferred embodiment includes an optical source 101, that generates collimated linearly polarized electro-magnetic radiation 103 that is applied to an optional polarization optic 105. The optional polarization optic 105 is a polarizer that enhances the degree of linear polarization of the radiation 103. The optional polarization optic 105 may also include a wave-plate to rotate the plane of polarization.

The linearly polarized radiation 123, is applied to a polarized beam splitter 107 that directs substantially all the radiation 109 of one linear polarization with a first polarization vector through the polarized beam splitter 107 towards a reflective element 111 also referred to herein as a reflective structure. Any residual radiation at a polarization angle orthogonal the first linear polarization vector is directed out of the system along the line labeled 113 (as is any leakage at the first polarization vector angle) or to an optional monitoring detector 115. The radiation 109 can be considered as a first ensemble of photons with a first polarization vector, The radiation 109 is incident on the reflective element 111 at normal incidence and, in the preferred embodiment, a substantial amount of the incident radiation 109 is reflected back along the same line as indicated by the line of the radiation 109.

The reflective element 111 has a property that can be dynamically configured by an electronic signal 117. In a first configuration of the reflective element 111, the dynamically configurable property is symmetric in that it reflects incident radiation with a polarization vector of any orientation with substantially the same high reflectivity. In this symmetric configuration the reflective element 111 has substantially no effect on the linear polarization vector of the radiation 109. In this first symmetric configuration, because there is no change in polarization upon reflection, the reflected radiation is directed back through the polarized beam splitter 107 back towards the optical source 101.

In this first configuration of the reflective element 111 there is substantially no radiation redirected by the polarized beam splitter 107 along the output direction indicated by 113 (because there is no change in polarization caused by the reflective element 111). In this configuration, the actual amount of radiation redirected by the polarized beam splitter 107 is determined by the extinction ratio of the polarized beam splitter 107. Even a low cost consumer polarized beam splitter can be very high extinction ratio.

In a second configuration of the reflective element 111, the dynamically configurable property is asymmetric in that the reflectivity of the reflective element 111 is different for incident radiation of different polarization vector orientation. In the preferred embodiment the reflective element 111 would have a first reflectivity if orientated parallel to the polarization vector of the incident radiation and would have a second different reflectivity if orientated perpendicular (or orthogonal) to the polarization vector of the incident radiation. In the preferred embodiment the first reflectivity is a high reflectivity of greater than 97.5% and the second reflectivity is greater than 95% but less than the first reflectivity.

In the preferred embodiment the asymmetry of the second configuration of the reflective element 111 is a periodic perturbation that can be dynamically induced. The periodic perturbation can be considered as a diffractive grating, also referred to as a diffractive element, which diffracts a small amount of incident radiation with a polarization vector perpendicular to the effective lines of the diffractive element, thereby reducing the reflectivity for incident radiation with this polarization vector.

The dynamically induced diffractive element has substantially no effect on incident radiation with a polarization vector parallel to the effective lines of the diffractive element, thereby enabling higher reflectivity for incident radiation with this polarization vector than for incident radiation with a polarization vector perpendicular to the effective lines of the diffractive element.

In the preferred embodiment the diffractive element is azimuthally aligned at an angle of 45 degrees with respect to the linear polarization vector of the radiation incident on the reflective element 111. This alignment of the diffractive element causes the incident radiation to behave as if 50% of the photons have a polarization vector perpendicular to the effective lines of the diffractive element 50% of the photons have a polarization vector parallel to the effective lines of the diffractive element.

Incident radiation can be considered as an ensemble of photons. The polarization vector of an incident ensemble of photons can be considered as a quantum state of the incident radiation. When the incident ensemble of photons encounters the diffractive element azimuthally aligned at 45 degrees with respect to the polarization vector of the incident radiation, the diffractive element causes the quantum state of incident photons to switch to one of two quantum states both of which have polarization vectors at an angle of 45 degrees to the polarization vector of the incident radiation. The polarization vectors of the two sets of photons have orthogonal polarization vectors, i.e. that are at an angle of 90 degrees with respect to each other.

This switching to one of two quantum states results in the incident ensemble of photons with a first polarization vector, that can be considered as a first quantum state, being resolved into two reflected ensembles of photons, with different polarization vectors from each other and with polarization vectors that are different from the first polarization vector of the incident radiation. The resulting two polarization vectors of the reflected radiation can be also considered as quantum states different from the quantum state of the incident radiation.

The occurrence or non-occurrence of this quantum state switching from an incident first polarization vector of the incident radiation to at least one second different polarization vector of the reflected radiation is dependent on the presence or absence of the diffractive element and is substantially insensitive to the magnitude of the diffraction effect (or diffraction efficiency) of the diffractive element.

This insensitivity to the magnitude of the diffraction effect is of both practical and of philosophical interest. In contrast, conventional optical switches, such as a Pockels cell, rely on a relatively weak electro-optic effect and application of a high voltage to incrementally rotate a polarization vector as radiation propagates through a significant volume of such a cell. In the case of a Pockles cell the magnitude of the rotation is sensitive to the magnitude of the electro-optic effect and typically requires propagating through a significant length of material to accomplish a significant polarization vector rotation.

In the preferred embodiment the magnitude of the diffraction efficiency does determine the decrease in intensity of the radiation associated with one reflected ensemble of photons. In the preferred embodiment the diffraction efficiency of the induced diffractive element is small resulting in an intensity decrease of a reflected ensemble of photons of not greater than 2.5%. In other embodiments the induced diffractive element could have higher diffraction efficiency. Furthermore the relative phase of the two reflected ensembles can be controlled by design.

Referring again to FIG. 1 with the reflective element 111 in the second configuration. The reflected radiation, with an angle of substantially 45 degrees with respect to the polarization vector of the radiation incident on the reflective element 111, is reflected back to the polarized beam splitter 107 and approximately 50% of this reflected radiation is redirected by the polarized beam splitter 107 along the direction indicated by 113 which is the output direction.

The remaining approximately 50% of the reflected radiation is directed by the polarized beam splitter 107 back towards the optical source 101. In situations where the optical source can be adversely affected by radiation being sent back to the optical source, the source can be isolated from such back directed radiation using conventional isolation techniques.

In this second configuration of the reflective element 111, there is a substantial amount of radiation redirected by the polarized beam splitter 107 along the output direction indicated by 113. That is, a substantial amount of radiation is switched in the direction indicated by 113.

The electronic signal 117 switches the reflective element 111 between the first and second configurations and thereby switches between (a) redirecting substantially no radiation by the polarized beam splitter 107 along the output direction indicated by 113; and (b) redirecting approximately 50% of the radiation reflected back to the polarized beam splitter 107, i.e. the electronic signal modulates or switches the radiation output along the output direction indicated by 113.

Figure 1A:
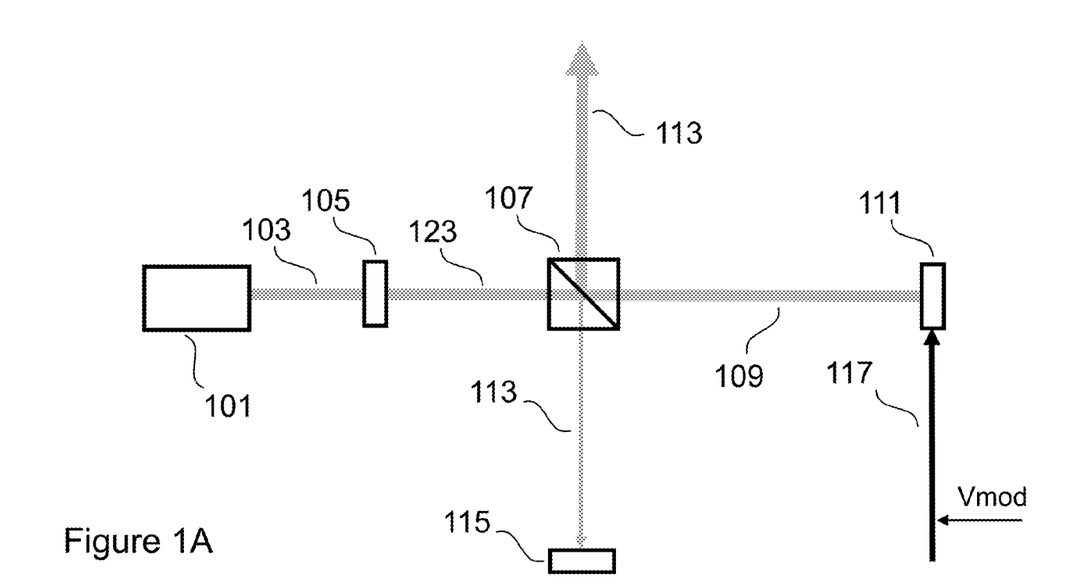
FIG. 1A is an illustration of a preferred embodiment in which a dynamically configurable reflective element in combination with a polarized beam splitter comprises an optical modulator according to the invention.
Figure 1B:
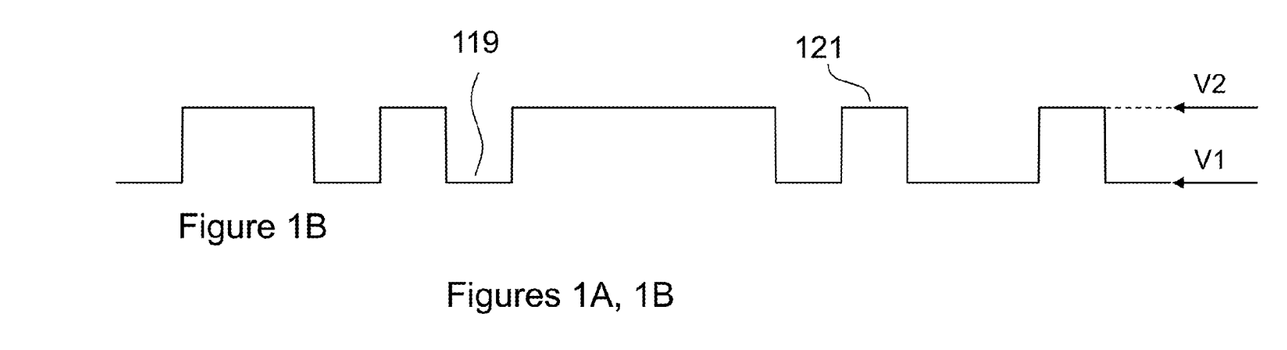
FIG. 1B is an illustration of an example of a modulating signal.

An example of a OOK type modulating signal is illustrated in FIG. 1B of Sheet 1 where the voltage at a first level indicated by 119 is at a first voltage, V1, (which in the preferred embodiment is ground voltage). When this first voltage is applied to the dynamically configurable asymmetric property of the reflective element 111 (by way of the electronic signal 117 which is also referred to as Vmod), it has no effect on the linear polarization of the radiation 109. In this configuration the reflected radiation is directed through the polarized beam splitter 107 back towards the optical source 101.

In the situation where the voltage applied to the dynamically configurable property is at a second different level, V2, indicated by 121, which puts the dynamically configurable property of the reflective element 111 into a second configuration that is an asymmetric configuration. In this configuration the linear polarization vector of the reflected radiation is at an azimuthal angle of substantially 45 degrees with respect to the polarization vector of the radiation incident on the reflective element 111 (i.e. the first ensemble of photons).

In this asymmetric configuration of V2, the resulting reflected radiation is redirected by the polarized beam splitter 107 along the direction indicated by 113 which is the output direction. Thus the radiation is intensity modulated in a manner determined by the electronic modulating signal 117. The combination of the polarized beam splitter 107 and the dynamically configurable reflective element 111 comprises an optical modulator and is also referred to as a photonic switch.

The mechanism by which the electronic signal 117 switches the reflective element 111 of FIG. 1A between the first and second configurations is illustrated in and described with respect to FIG. 2. The dynamically configurable reflective element 111 (of FIG. 1A) is shown in more detail in FIGS. 2A, 2B and 2C.

Figure 2A:
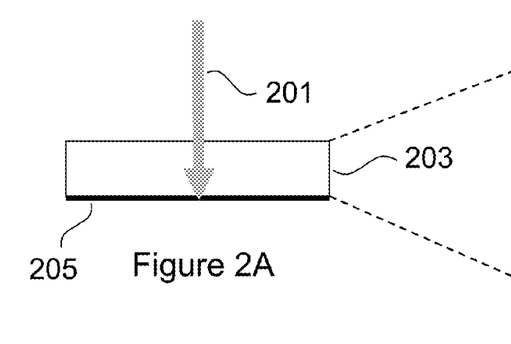
FIGS. 2A, 2B, 2C and 2D illustrate in more detailed the dynamically configurable reflective element.

FIG. 2A depicts the incident radiation 201 passing through a substrate 203 to the reflecting element 205. An expanded view (not to scale) of FIG. 2A is shown in FIG. 2B where again the incident radiation 207 passes through the substrate 209 and is substantially reflected by a first layer 211 that is optically highly reflective and has specific electrically conductive properties.

Figure 2B:
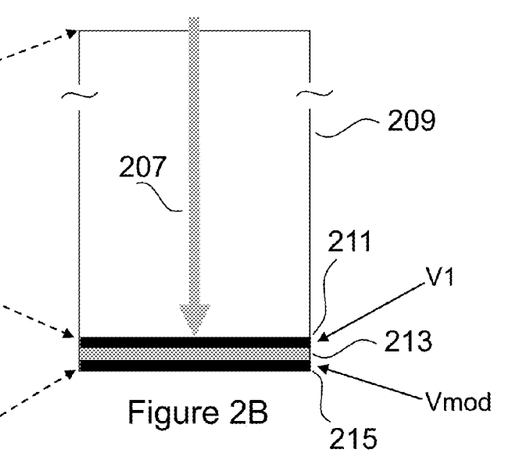

A second layer 213, that is an electrical insulating layer, electrically isolates the first layer 211 from a third layer 215. The third layer 215 is shown in more detail in FIG. 2C where a bottom view in the circle 217 depicts a patterned electrically conductive element that consists of a combination of large pads, such as 219, and a set of separated conductive lines, one of which is indicated by 221.

Figure 2C:
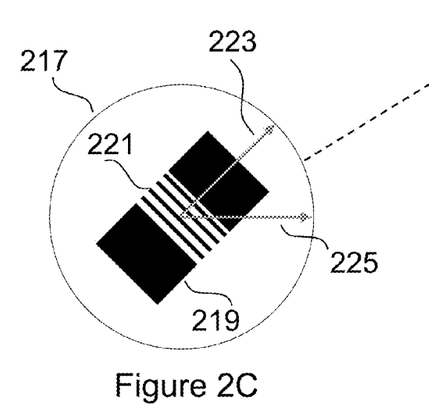

When an electrical current flows in the conductive lines, such as 221, it induces electrical behavior in the first layer 211 of FIG. 2B. The direction 223 of the patterned conductive lines, such as 221, is rotated (azimuthally) by approximately 45 degrees from the direction of the polarization vector 225 of the incident radiation.

The induced electrical behavior in the first layer 211 is asymmetric and is also aligned with the direction 223. This induced asymmetric property in the first layer 211 generates an effective diffractive element in this first layer 211. The induced diffractive element modifies the polarization vector of the incident radiation such that the reflected radiation has different polarization characteristics.

Figure 2D:
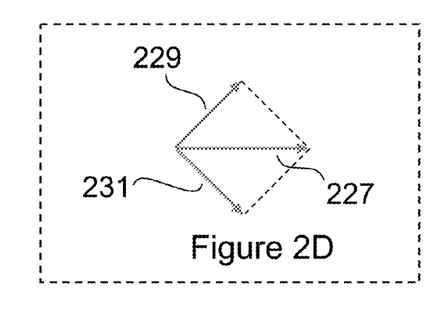

The polarization vector of the incident radiation is illustrated in FIG. 2D, as 227. The vector 227 can be resolved into component 229 (parallel to the direction 223 of the conductive lines 221) and component 231 perpendicular (or orthogonal) to direction 223.

The incident radiation is composed of a collection of photons, also referred to as an ensemble of photons. The ensemble of photons has a polarization vector determined by the polarized beam splitter 107 of FIG. 1A. When the ensemble of photons encounters the reflective element 111 in the first configuration, i.e. the symmetric configuration, the ensemble of photons is reflected with its polarization vector substantially unchanged.

When the ensemble of photons encounters the reflective element 111 in the second configuration, i.e. the asymmetric configuration, the ensemble of photons is resolved into two ensembles of photons. The first of the two ensembles of photons has a polarization vector 229 parallel to the direction 223. The second of the two ensembles of photons has a polarization vector 231 perpendicular (or orthogonal) to the direction 223.

When the two reflected ensembles of photons with polarization vectors 229 and 231 encounter the beam splitter 107 of FIG. 1 they are resolved into components one of which is parallel to the incident polarization vector 227 and the other of which is perpendicular to the incident polarization vector 227.

The parallel components pass through the beam splitter 107 back towards the optical source while the components perpendicular to the incident polarization vector 227 are redirected by the beam splitter 107 along the direction 113 of FIG. 1. In this manner the radiation propagating out of the system along direction 113 is intensity modulated by the modulating voltage applied to the patterned electrically conductive element.

The magnitudes of the two components 229 and 231 of FIG. 2D are depicted as being substantially the same value, however, in the preferred embodiment, the magnitude of one component will be diminished by the magnitude of the radiation that is diffracted by the induced asymmetric property of the diffractive element in the first reflective layer 211.

While in the preferred embodiment the first reflectivity is a high reflectivity of greater than 97.5% and the second reflectivity is greater than 95% but less than the first reflectivity, in another embodiment the second reflectivity is less than 95% and in yet another embodiment the magnitude of the second reflectivity is negligible.

Whether the reflected radiation consists of one ensemble of photons with the same polarization vector as that of the incident radiation or whether the reflected radiation consists of one or two ensembles of photons with polarization vectors different from that of the incident radiation depends on the presence or absence of the diffractive element and is substantially independent of the magnitude of the diffractive effect.

This substantial insensitivity to the magnitude of the diffractive effect enables achieving significant depth of modulation with weak modulating signals and thereby enables high speed operation and reduced sensitivity to noise on the modulating signal.

Depending on the specific application, the magnitude of the induced asymmetric property required to cause the incident ensemble of photons into two reflected ensembles of photons may be minimal, resulting in minimal diffracted radiation. Alternatively the magnitude of the induced asymmetric property can be large in order to significantly diminish the magnitude of one reflected ensemble. Furthermore the reflective element can be designed to achieve a desired relative phase of the two reflected ensembles of photons.

Figure 3:
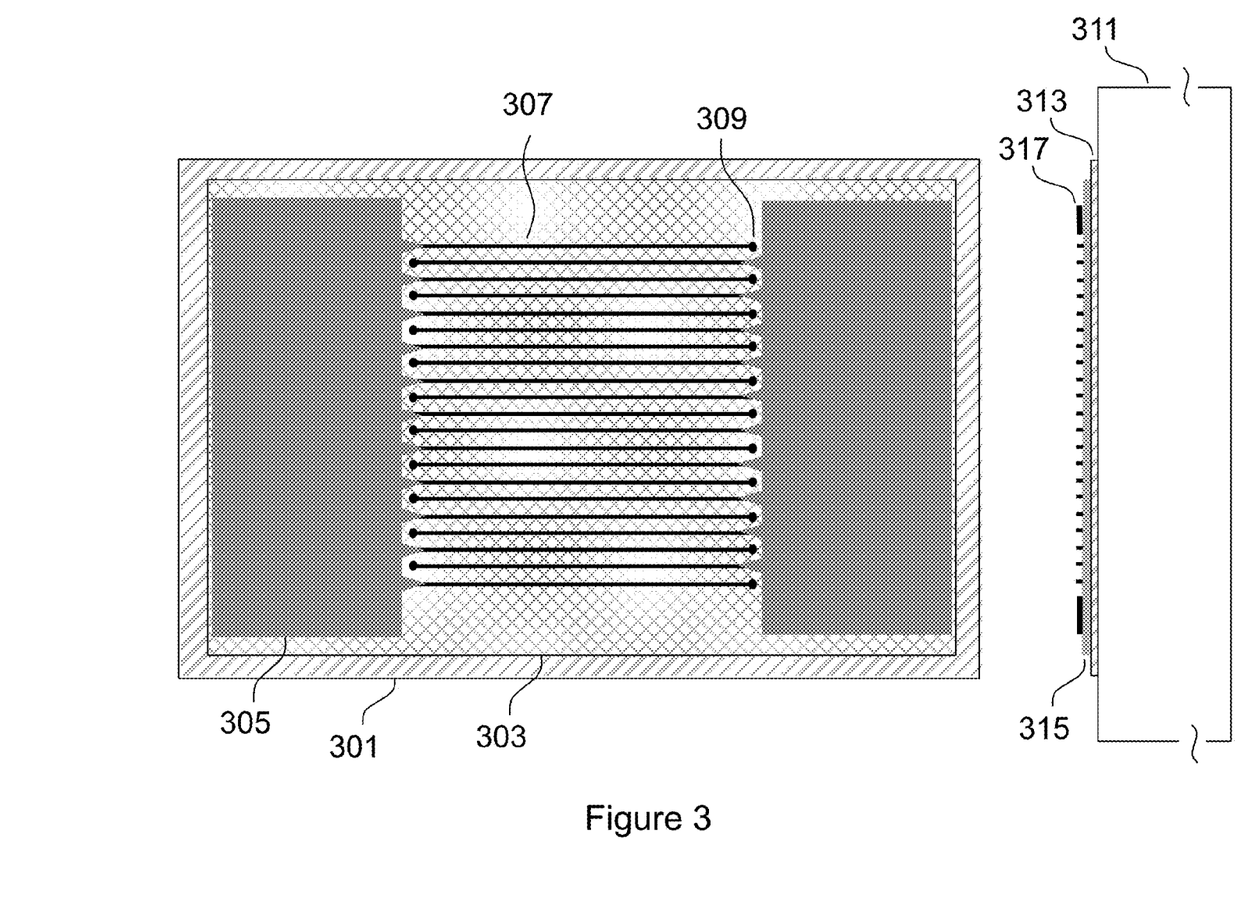
FIG. 3 is a detailed illustration of the preferred embodiment of the dynamically configurable reflective element.

A more detailed illustration of the preferred embodiment of the dynamically configurable reflective element is depicted in FIG. 3. The first layer 211 of FIG. 2B is depicted in FIG. 3 as 301 and in the preferred embodiment is comprised of a conductive material such as: gold; silver; copper; etc. or semiconducting materials such as silicon. An electrically insulating second layer 303 separates the first layer 301 from the third patterned layer 305 also comprised of a conductive material such as: gold; silver; copper; etc.

The patterned layer 305 includes interleaved conductive lines. An example of such a conductive line is 307. In the preferred embodiment one end of the conductive lines is connected by means of a through-hole or via to the first layer 301. Such through-holes are depicted by the circular ends of the lines, an example of which is depicted as 309.

A side view of the layers in relation to the substrate is depicted on the right hand side of FIG. 3 where the substrate 311, the first conducting layer 313, the insulating layer 315 and the patterned conducting layer 317 are all illustrated.

Figure 4:
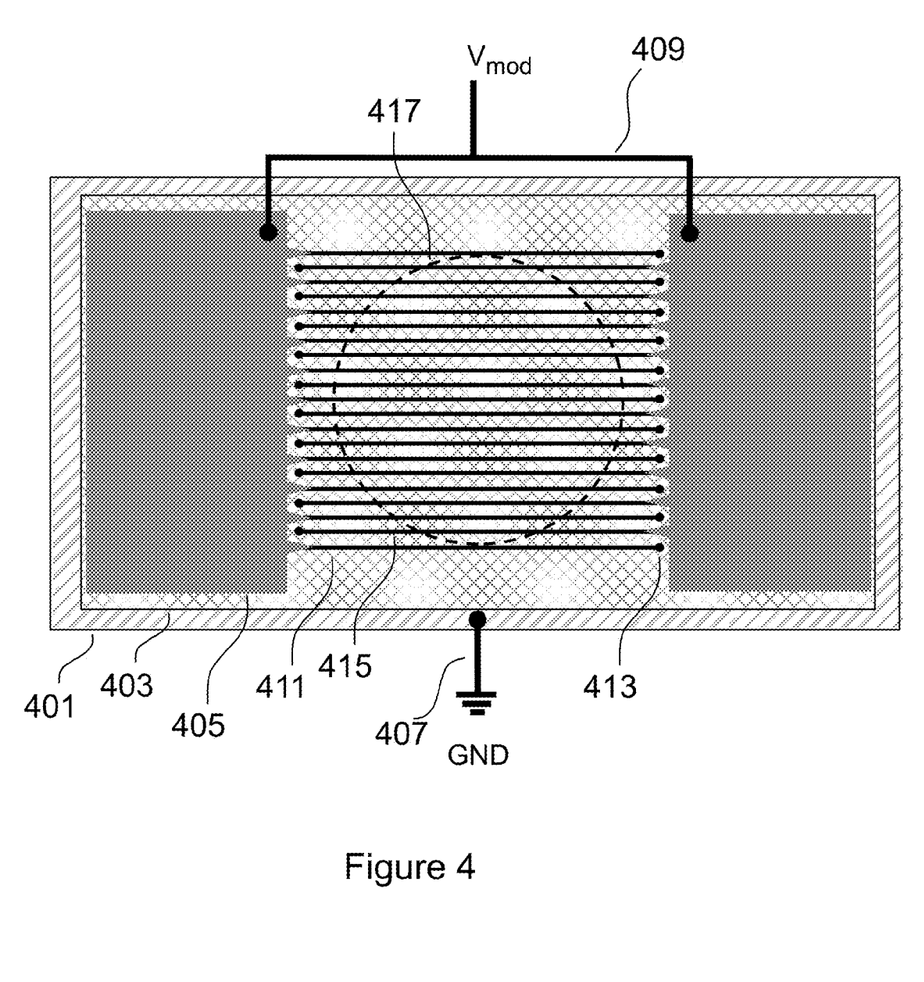
FIG. 4 illustrates electronic circuit aspects of the preferred embodiment of the dynamically configurable reflective element.

A schematic diagram illustrating electronic circuit aspects of the preferred embodiment of the dynamically reconfigurable reflective element is depicted in FIG. 4. The first conducting layer 401, the insulating layer 403 and the patterned conducting layer 405 are again illustrated. The first conducting layer 401 is connected to ground as indicated by 407. The patterned conducting layer 405 is connected to the modulating voltage Vmod indicated by 409.

As described earlier, the modulating voltage Vmod, indicated by 117, switches between a voltage V1 which in the preferred embodiment is ground and a different voltage V2. When the V2 voltage is applied to the patterned layer a current flows in one direction in the set of lines, of which 411 is one. The line 411 is connected to ground by way of the through-hole 413. Meanwhile a current will flow in the opposite direction flows in the second set of lines, of which 415 is one.

These counter flowing currents induce a periodic electrical pattern in the first conductive layer 401 which constitutes an asymmetric property of the reflective layer 401. The asymmetric property persists only as long as the non-zero voltage is applied to the patterned layer 405.

Ideally the incident radiation should encounter substantially the same asymmetric property at all regions of the cross-section of the beam and so should be confined to the region indicated by the dashed circle. The incident radiation may be focused within the dashed circle in order to minimize the area of the asymmetric property in order to optimize modulation speed or for other reasons.

It should be understood that the schematic diagram depicted in FIG. 4 is for illustrative purposes and not intended to be to scale or to be an accurate or complete depiction of the electronic aspects. Many considerations, such as modulation speed will determine an appropriate physical layout.

Figure 5:
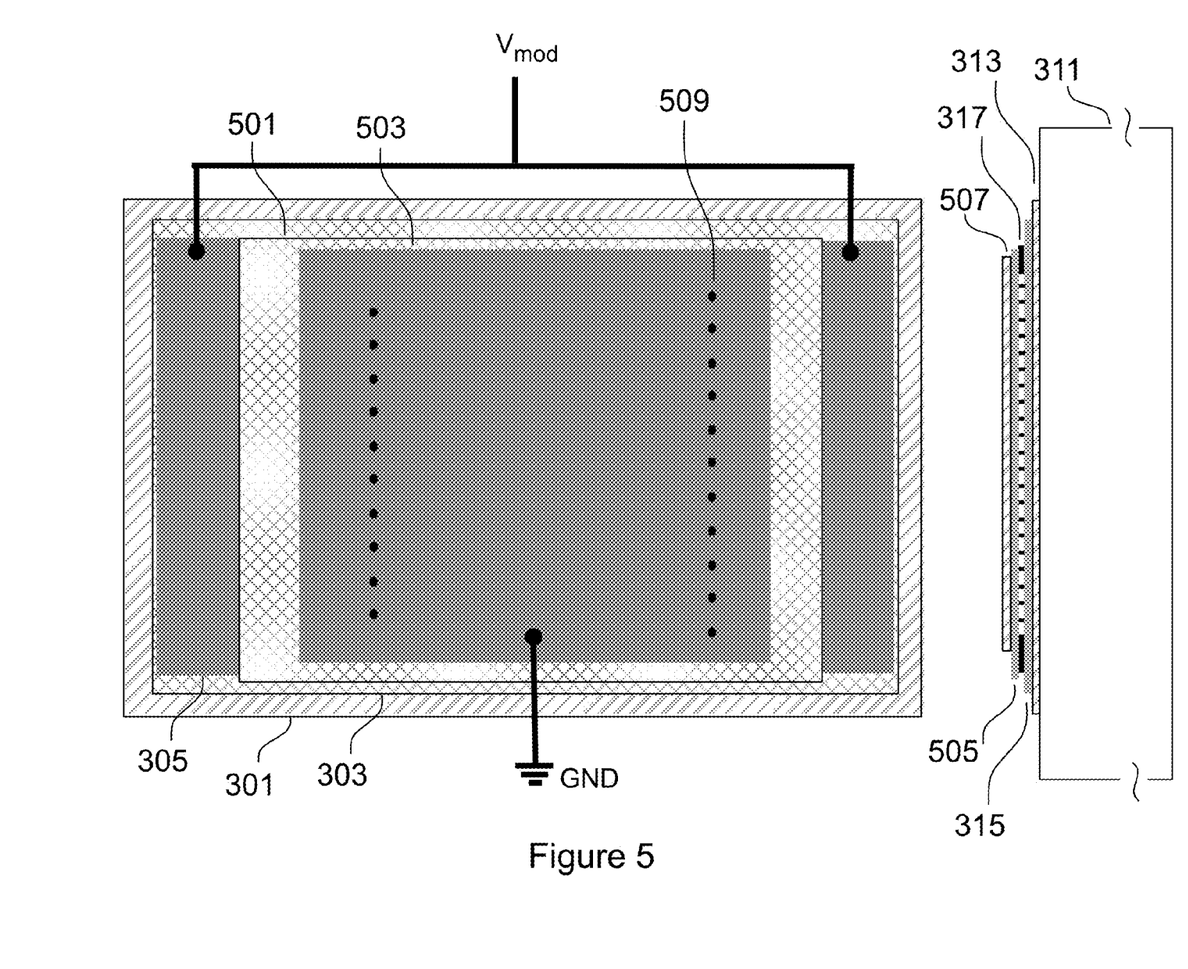
FIG. 5 is an illustration of an alternative embodiment of the dynamically configurable reflective element.

Embodiments other than the preferred embodiment are included in this invention. An alternative embodiment is illustrated in FIG. 5. In many respects this embodiment is similar to that depicted in FIG. 3 and FIG. 4, however in this embodiment there are two addition layers and the first layer 301 of FIG. 3 and 313 of FIG. 5 is not connected by through-holes to the patterned layer 305 of FIG. 3 and 315 of FIG. 5.

The two additional layers consist of an insulating layer 501 and a conductive layer 503. These layers are shown in side view as layers 505 and 507 respectively. In this embodiment the ends of the lines of the patterned layer 305 are connected by through-holes to the additional conductive layer 503. One such through-holes is indicated by 509.

In this embodiment the modulating voltage is again applied to the patterned layer 305. The additional conductive layer 503 is connected to ground. The first conducting layer 301 may optionally be also connected to ground.

Figure 6A:
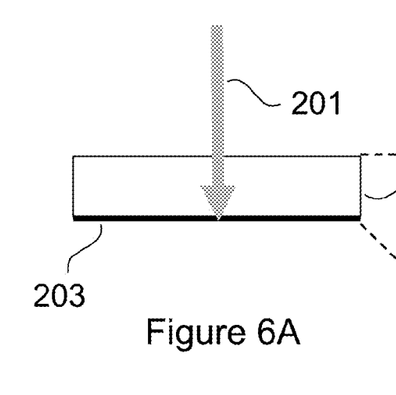
FIGS. 6A, 6B and 6C illustrate another alternative embodiment of the dynamically configurable reflective element.
Figure 6B:
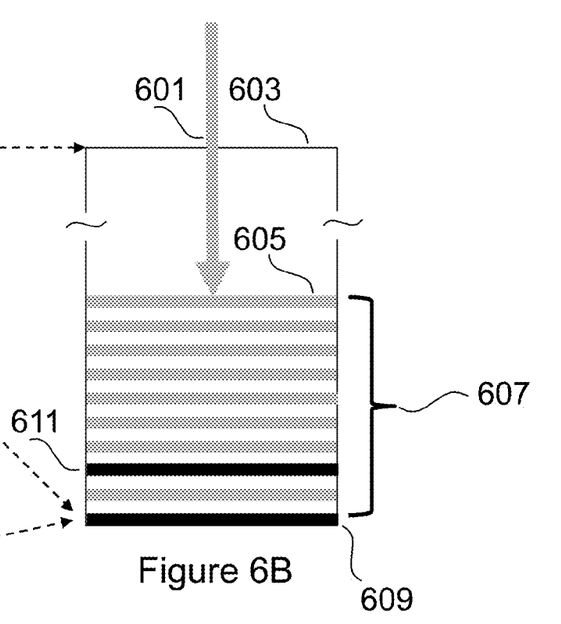
Figure 6C:
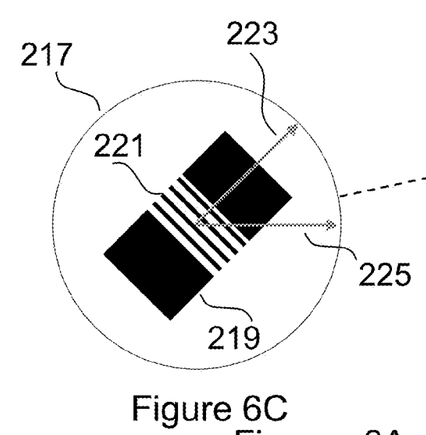

A second alternative embodiment is illustrated in FIG. 6 which in many respects is similar to the first alternative embodiment described above. In this second alternative embodiment the incident radiation 601 propagates through a substrate 603 that has a reflective dielectric stack 607 deposited on its base. The dielectric stack 607 is also referred to as a reflective structure. Additional layers 609 and 611 are also deposited and consist of a patterned conductive layer 609 and a conductive layer 611 with one or more insulating layers separating the patterned layer from a conductive layer.

The conductive layer is connected to the ends of the conductive lines of the patterned layer by means of through-holes in a similar manner as in the first alternative embodiment. In this second alternative embodiment, layer 611 of the dielectric stack is a conductive but optically transparent layer in which the asymmetric property is induced.

Many variations of this second alternative embodiment are possible. For example, layer 611 could consist of non-conducting material in which an asymmetric charge distribution is the asymmetric property induced by the electric currents in the patterned layer. More than one 611 layer could be embedded in the dielectric stack. In yet another alternative embodiment, such layers could have their refractive index modified to generate one or more asymmetric refractive index distribution in response to the electric currents in the patterned layer.

In the preferred embodiment the modulating signal shown in FIG. 1B is a digital waveform with an abrupt transition between the high and low voltage values. The transition between the high and low voltage values cause the transition between the symmetric and asymmetric configurations of the dynamically configurable element which in turn causes the reflected radiation to consist of a single ensemble of photons with one polarization vector or to consist of two ensembles of photons with two different polarization vectors.

As previously indicated, switching to the state consisting of two ensembles of photons with two different polarization vectors depends on the existence of the asymmetric configuration and is relatively insensitive to the magnitude of the asymmetry and therefore insensitive to the magnitude of the high voltage. This insensitivity to the magnitude of the asymmetry has significant practical value.

One practical value of being insensitive to the magnitude of the asymmetry is that the speed of switching from one state to the other is less sensitive to the rise and fall time of the electronic signal. A second practical value is that the depth of modulation of the output modulated optical radiation 113 of FIG. 1 is determined by the extinction ratio of the polarized beam splitter 107 of FIG. 1 (or the extinction ratio of an equivalent optical element in other embodiments).

Figure 7A:
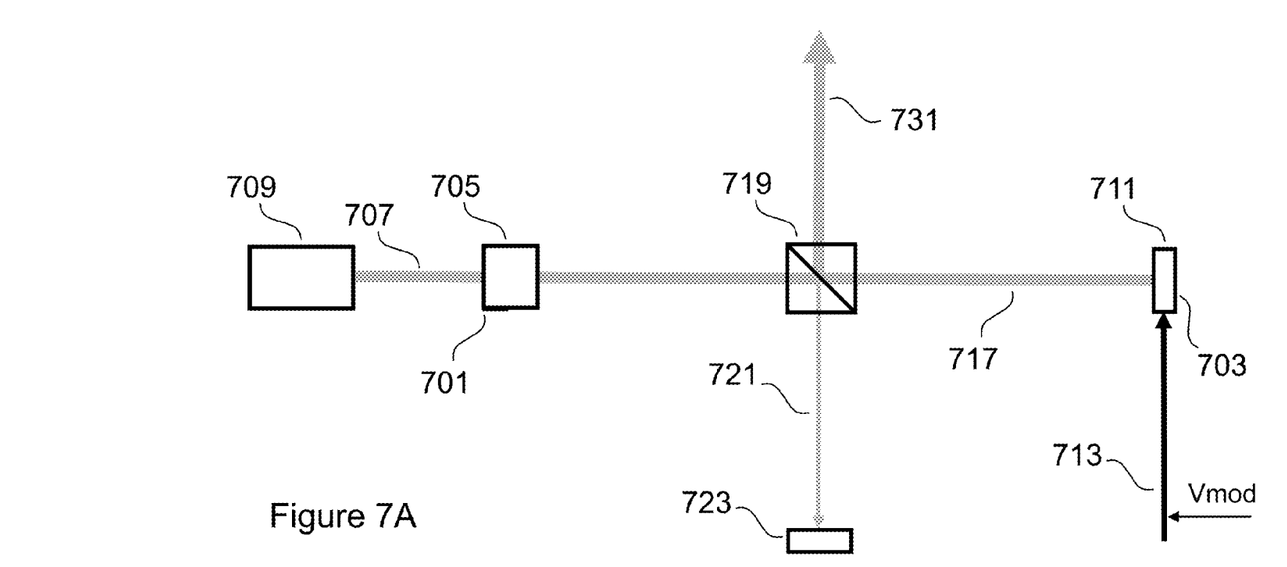
FIGS. 7A and 7B illustrate yet another embodiment of the inventive system suitable for applications such as: (a) mode-locking a laser, (b) cavity dumping a laser.

The modulating digital waveform of the preferred embodiment is suitable for applications such as optical communications or optical storage, however, other modulating waveforms are suitable for other applications. An application involving mode-locking a laser is illustrated in FIG. 7 which includes a simplified schematic diagram of an end pumped laser. The laser cavity is comprised of the two reflective elements 701 and 703.

The reflective element 701 is one end of a lasing material 705. The reflective element 701 is highly transmissive at the pump wavelength of the pump radiation 707 emitted by the pump source 709. The pump source 709 may, for example, be a laser diode. The reflective element 701 is also highly reflective at the lasing wavelength or wavelength range.

The reflective element 703 is a dynamically configurable reflective element on a substrate 711 as described earlier. With no modulating signal being applied to the dynamically configurable reflective element 701 the reflective element 701 is highly reflective at the lasing wavelength or wavelengths which confines the lasing electromagnetic radiation within the laser cavity.

In this first configuration of the dynamically configurable property of the reflective element 701 the polarization vector of electromagnetic radiation of the laser cavity remains substantially unchanged upon reflection at the reflective element 701, thus allowing the electromagnetic radiation to substantially remain in the laser cavity. This lasing radiation constitutes a first lasing ensemble of photons with a first polarization vector.

The reflective element 701 is configured to be azimuthally aligned with respect to the polarized beam splitter 719, located in the laser cavity, which is also referred to as a first polarized optical element such that when the dynamically configurable element of the reflective element 701 is in the second configuration then the first lasing ensemble of photons is resolved into two second ensembles of photons with polarization vectors different from the first lasing ensemble of photons.

A polarized beam splitter 719 located in the laser cavity is azimuthally aligned with the preferred polarization vector of the lasing radiation 717. This polarized beam splitter 719 will direct any residual radiation at a perpendicular or orthogonal polarization vector out of the cavity along directions 731 and 721. Any radiation directed along the direction 721 may be detected by an optional detector 723.

Applying the modulating signal 725 (also referred to as Vmod) to the dynamically configurable reflective element 703 periodically switches the reflective element 703 between its two configurations. Only photons or photon ensembles whose polarization vector encounters the reflective element 703 while it is in its configuration determined by the first voltage, V1, propagate back through the polarized beam splitter 719 substantially unaffected by the polarized beam splitter 719.

Photons or photon ensembles whose polarization vector encounters the reflective element 703 while it is in its configuration determined by the second voltage V2, or some fraction thereof, propagate back through the polarized beam splitter 719 with a polarization vector component that will be directed by the polarized beam splitter 719 out of the laser cavity along the direction of 731.

Figure 7B:
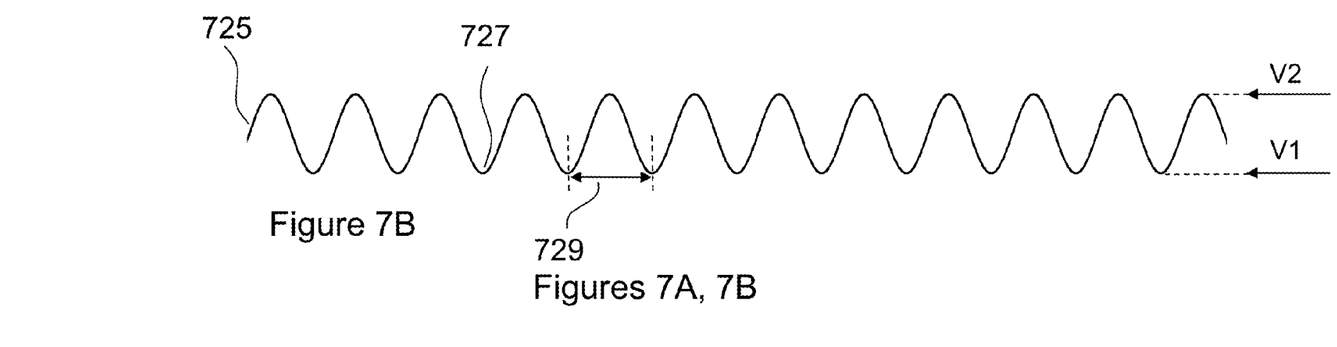

An electronic modulating signal suitable for mode-locking the laser of FIG. 7A is illustrated in FIG. 7B. The electronic modulating signal 725 is a sine wave type signal that periodically varies from one voltage (V1, which is typically ground) indicated by 727 to a different second voltage (V2). The period of the signal 729 is selected to match the round trip time of radiation in the laser cavity of FIG. 7A.

The electronic signal with the second voltage (V2) is applied, synchronously with the round trip time of the laser cavity, to the reflective element with a dynamically configurable property, such that the electronic signal configures the reflective element 703 in the second configuration whereby at least a portion of the lasing ensemble of photons is resolved into two second ensembles of photons with polarization vectors different from the first lasing ensemble of photons.

This will cause at least a portion of the two second ensembles of photons to be directed by the polarized beam splitter 719, also referred to as a polarization element, out of the laser cavity. Thus the first lasing ensemble of photons is loss modulated and since the modulating voltage (V2) is applied synchronously with the round trip time of the laser cavity, it is a periodic loss modulation that has the effect of mode-locking the lasing electromagnetic radiation of the laser cavity in a manner similar to conventional acousto-optic or phase modulation mode-locking that will be familiar to one skilled in the art.

Any residual photons with the same polarization vector (possibly amplified by the lasing material 705) are directed out of the laser cavity along the direction of 721 by the polarized beam splitter 719.

Figures 8A, 8B:
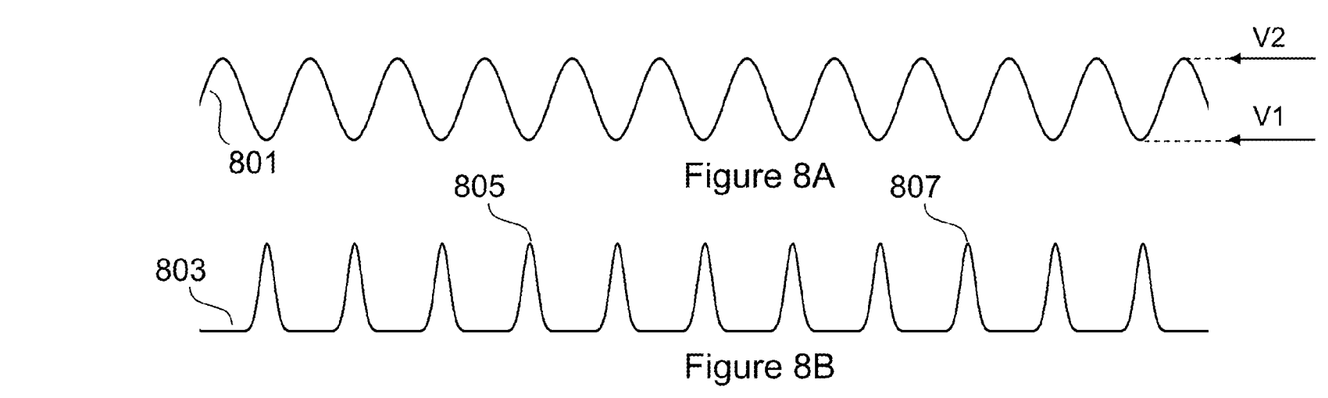
FIG. 8 is a an illustration of signals associated with the laser: (a) a modulating signal; (b) the resulting mode-locked optical pulse train; (c) a modified modulating signal; (d) the resulting mode-locked optical pulse output from the laser cavity due to modulating signal in FIG. 8C.

FIG. 8A, the top trace of FIG. 8 again depicts electronic mode-locking drive signal 801 that mode-locks the radiation in the laser cavity of FIG. 7. The next to top trace 803 in FIG. 8B depicts the resulting mode-locked optical pulse train. The trace 803 shows the intensity profile of a time sequence of optical pulses, one of which is 805. The pulse width of such pulses is determined (in part) by the bandwidth of the lasing material 705 of FIG. 7.

Figure 8C:
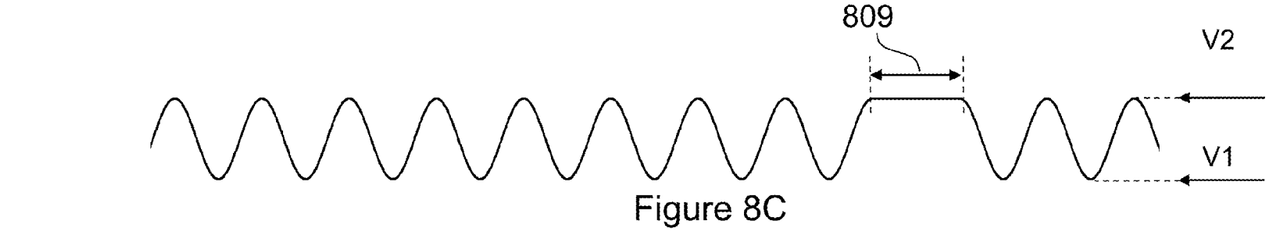

By modifying the electronic modulating signal 713 of FIG. 7, that is applied synchronously with the round trip time of the laser cavity, so that it is an extended electronic signal that remains active for at least the duration of a mode-locked pulse in the manner depicted in FIG. 8C where the electronic modulating signal remains at the high voltage V2 for the time period between the dashed lines indicated by the double arrow 809.

Applying the high voltage V2 for the time period 809 causes the polarization vector of the pulse 807 of FIG. 8B to be at least in part switched or rotated with respect to the polarization vector of the incident pulse. This polarization rotation causes a portion of pulse 807 of FIG. 8B to be directed out of the laser cavity of FIG. 7A by the polarized beam splitter 719 along the direction 731 of FIG. 7A.

In this manner, at least a portion of a first ensemble of photons that constitutes at least one mode-locked pulse is resolved into two second ensembles of photons with polarization vectors different from said ensemble of photons and since they have polarization vectors that are different from the polarization vector of the lasing radiation, at least a portion of at least one of the second ensembles of photons will be directed by the polarized beam splitter 719 out of the laser cavity. This is also referred to as dumping a pulse from the laser cavity.

Figure 8D:
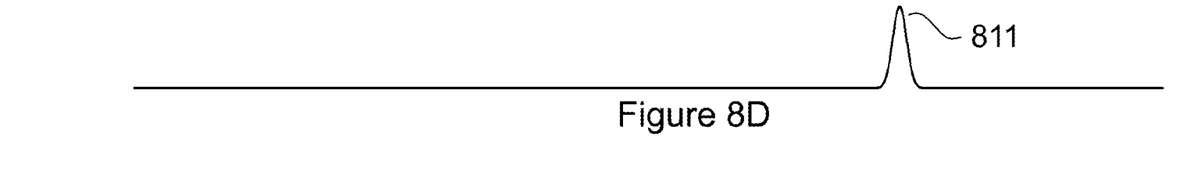

The single pulse dumped from the laser cavity of FIG. 7A is depicted as 811 of FIG. 8D. The extended high modulation voltage 809 can occur periodically or can occur according to a selected pattern. For example a periodic repetition of the extended high voltage 809 every N cycles of the modulating signal would produce a pulse train with a repetition rate N times lower than the repetition rate of the original mode-locked pulse train depicted in FIG. 8A.

Such reduction in pulse train repetition is useful in an embodiment that consists of a compact mode-locked laser which generates a high repetition rate mode-locked pulse train (because of its short round trip time) but enables using conventional detection and electronic techniques that typically operate at lower repetition rates and thereby reduces the electronic bandwidth requirements of the system.

Such reduction in pulse train repetition rate is also useful in generating very low repetition rate pulse trains similar to those achieved by conventional cavity dumping techniques. However, with the present invention, a very compact cavity dumped mode-locked laser can be achieved.

It should be understood that the diagram depicted in FIG. 7A is a simplified diagram of a mode-locked laser for illustrative purposes. An actual mode-locked laser, such as a Ti:saphire (titanium:sapphire) mode-locked laser, may have additional optical elements, such as focusing elements and dispersive elements. Such dispersive elements may be prisms or mirrors.

It should also be understood that the applications of the invention described herein are to illustrate the invention and not intended to limit the scope or application of the invention. In addition to optical switching or modulation for: optical communications; optical data storage; mode-locking or cavity dumping lasers; the invention is suitable for other applications including, but not limited to, display systems, such as video display systems.

It should further be understood that the above description is intended to be illustrative and not restrictive. Many variations and combinations of the above embodiments are possible. Many of the features have functional equivalents that are intended to be included in the invention as being taught and many other variations and combinations of the above embodiments are possible, for example, various combinations of beam-splitters can be used, including but not limited to: cube beam splitters; plate beam splitters.

The preferred embodiments illustrated are free space configurations. Equivalent configurations could be implemented in optical fiber or in combinations of free space and optical fiber. In such designs or configurations beam-splitters could be replaced by fiber couplers. Equivalent configurations could be implemented using wave-guide techniques.

The invention applies to all regions of the electro-magnetic spectrum, including but not limited to, micro-wave, infra-red, visible, ultra-violet, X-ray, or gamma ray and is not restricted to the region conventionally referred to as optical.

Optical sources, include but are not limited to, light emitting diodes (LED); superluminescent diodes (SLD); laser sources; laser diodes; fiber lasers; wavelength tunable laser diodes; swept source lasers; mode-locked lasers; and continuum generating sources.

The preferred embodiments include collimated optical sources, however, they could also various combinations of lenses or lens arrays could be employed to collimate the radiation or to focus the radiation onto the dynamically configurable reflective element.

In the preferred embodiments, the asymmetric property that resolves the incident ensemble of photons into two ensembles of photons with different polarization vectors is a diffractive element that is dynamically induced by means electric currents, i.e. the diffractive element is electronically induced. Furthermore, in the preferred embodiments the induced diffractive element is normal to the incident radiation.

In other embodiments the induced diffractive element could be aligned with the incident radiation in a manner other than normal, for example, in a plane parallel to the incident radiation. In other embodiments a dynamically induced asymmetric property could be a diffractive element induced by means other than electric currents, for example, by magnetic means, or by an optical interference based fringe pattern, i.e. by an optical interference signal.

In other embodiments a dynamically induced asymmetric property need not be based on inducing a diffractive element, but could be any asymmetric property that can be dynamically induced and that resolves an incident ensemble of photons into one or two ensembles of photons where the polarization vectors of the one or two resolved ensembles are different from each other and different from the polarization vector of the incident ensemble.

In the preferred embodiments, the polarization vector of the incident radiation on the dynamically configurable reflective element is substantially azimuthally at 45 degrees to the direction of the direction of the diffractive element. In other embodiments, the polarization vector of the incident radiation on the dynamically configurable reflective element can be at angles different from 45 degrees to the direction of the direction of the diffractive element.

In the preferred embodiments, the two resolved ensembles of photons are reflected by a reflective structure along the direction of incidence of the incident ensemble of photons. In other embodiments the two resolved ensembles of photons could be reflected at one or more angles with respect to the direction of incidence of the incident ensemble of photons or could be transmitted through the structure along the direction of incidence or transmitted at one or more angles with respect to the direction of incidence of the incident ensemble of photons.

In the preferred embodiments the polarization vector of the incident ensemble of photons can be considered as a quantum state of the incident radiation. The reflective element with the dynamically configurable asymmetric property leaves the quantum state of the ensemble of photons unchanged when in its symmetric configuration.

In its asymmetric configuration, the reflective element with the dynamically configurable asymmetric property switches the quantum state of the incident photons resulting in one or two ensembles of photons with quantum states different from the quantum state of the incident photons.

In other embodiments a quantum state other than one related to a polarization vector could be switched by a dynamically configurable property other than a reflective element with a dynamically configurable diffractive element. In general the dynamically configurable property can switch a quantum state of ensemble of photons to at least one different quantum state when in an asymmetric configuration and leave the quantum state substantially unchanged when in its symmetric configuration.

Figures 9A, 9B, 9C:
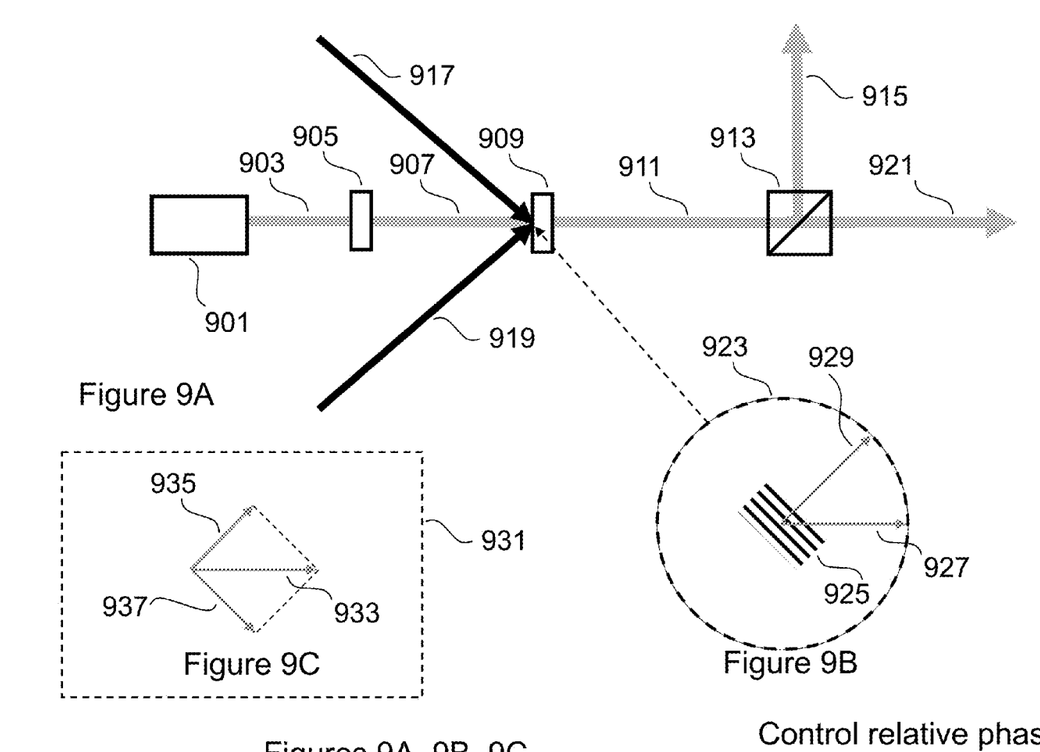
FIGS. 9A, 9B and 9C illustrate an embodiment of the inventive system where the dynamically configurable element consists of an induced diffraction grating that is imposed by an optically generated interference pattern.

An example of an embodiment that is a combination of the above described examples is illustrated and described with respect to FIG. 9. This embodiment again includes an optical source 901, that generates collimated linearly polarized electro-magnetic radiation 903 that is applied to an optional polarization optic 905. The optional polarization optic 905 is a polarizer that enhances the degree of linear polarization of the radiation 903. The optional polarization optic 905 may also include a wave-plate to rotate the plane of polarization.

The linearly polarized radiation 907, is applied to a dynamically configurable element 909 that has a property that can be dynamically configured by an optical signal. In a first configuration of the dynamically configurable element 909, the dynamically configurable property is symmetric. In this symmetric first configuration it transmits incident radiation 907 with no effect on the linear polarization vector of the radiation 907.

In this first configuration of the dynamically configurable element 909, the output radiation 911, with no modification of polarization vector, is applied to a polarized beam splitter 913 which is azimuthally oriented to direct substantially all the radiation 911 transmitted with the dynamically configurable element 909 in the (symmetric) first configuration in the direction indicated by the arrow 915.

In this embodiment the dynamically configurable property of the dynamically configurable element 909 is an optically induced diffractive element. Such a diffractive element may be induced in the dynamically configurable element 909 by the imposition of an optical interference based fringe pattern.

Such an interference based fringe pattern may, for example, be generated by directing two coherent laser beams 917 and 919 at the dynamically configurable element 909.

The angles of incidence and wavelength of the two coherent laser beams can be selected to generate an interference based fringe pattern with a spatial periodicity designed to optimize diffraction of the wavelength of the radiation 911. There are many conventional techniques for generating such a fringe pattern based on well known interference effects.

In the case of the imposed interference based fringe pattern being induced in a non-conductive layer (transparent at the wavelength of the incident radiation 907), the fringe pattern causes a perturbation of the charge distribution thereby inducing a diffractive element corresponding to the imposed optical interference based fringe pattern. In other embodiments the interference based fringe pattern could induce magnetic or electric fields or electric currents that would constitute a periodic perturbation.

A representation of such an imposed interference based fringe pattern, that constitutes one configuration of the dynamically configurable element 909, is depicted in (the dashed circle) FIG. 9B. The azimuthally asymmetric pattern 925 is azimuthally aligned at substantially 45 degrees with respect to the azimuthal direction 927 of the polarization vector of the radiation 907.

In this asymmetric configuration of the dynamically configurable element 909, the induced diffractive element 925 resolves the ensemble of photons that constitute radiation 907 with polarization vector 933 of FIG. 9C (in dashed box 931) into two ensembles of photons with polarization vectors 935 and 937 of FIG. 9C that propagate at least in part as radiation 911.

When the two ensembles of photons with polarization vectors 935 and 937 encounter the polarized beam splitter 913. A component of each of the two ensembles of photons with polarization vectors 935 and 937 are resolved propagates through the polarized beam splitter 913 as output radiation 921.

Thus the presence or absence of the interference pattern 925 determines the presence or absence of the output radiation 921, i.e. the output radiation 921 is switched on or off by the presence or absence of the interference pattern.

More generally FIG. 9 depicts a system for modifying a quantum state of electromagnetic radiation comprising an optical source that generates electromagnetic radiation with a first linear polarization vector which constitutes a first ensemble of photons with a first quantum state and a transmissive optical element upon which a dynamically configurable optically induced diffraction grating can be imposed which constitutes a transmissive element with a dynamically configurable property to which the above mentioned radiation, i.e. the first ensemble of photons is applied.

The optical interference fringe pattern that optically induces the diffractive pattern is generated by convention optical interference means using one or more coherent laser sources and constitutes a signal generator that generates the signal that is applied to the transmissive element with a dynamically configurable property, i.e. the diffractive element that can be imposed.

The presence of the optically induced diffractive grating causes at least a portion of the incident electromagnetic radiation with a first linear polarization vector (i.e. the first ensemble of photons with a first quantum state) to be resolved into two ensembles of photons with polarization vectors different from the first linear polarization (i.e. the first ensemble of photons with a first quantum state is switched to at least one second ensemble of photons with a quantum state different from the quantum state of said first ensemble of photons.

The polarized beam splitter 913 enables only components of the resolved ensembles of photons with polarization vectors orthogonal to the polarization vector of the first ensemble of photons to be output. In another embodiment the polarized beam splitter 913 could be replaced by a conventional polarizer.

The relative phases of the two resolved ensemble of photons could be controlled to have a desired relationship (such as being coincident) by designing the optical element 909 (upon which the diffractive element is imposed) to have bulk birefringent properties for vectors 935 and 937 such that the desired relationship is achieved.

Rather than a system that includes an optical source 901 (and possibly the optional element 905) a device could be configured that was comprised of: (a) the dynamically configurable element; (b) the signal generator for generating and applying the interference fringe pattern; and (c) a polarizing output element, either polarized beam splitter, polarizer, or an equivalent.

Other examples will be apparent to persons skilled in the art. The scope of this invention should be determined with reference to the specification, the drawings, the appended claims, along with the full scope of equivalents as applied thereto.

What is claimed is:

1. A system for modifying the polarization vector of electromagnetic radiation, said system comprising:
an optical source that generates a first ensemble of photons with a first polarization vector;
a reflective element with a dynamically configurable property to which said first ensemble of photons is applied;
an electronic signal generator with which an electronic signal is generated and applied to said reflective element with a dynamically configurable property, such that said electronic signal switches said reflective element between at least a first and a second configuration where said first configuration of said reflective element has substantially no effect on said first ensemble of photons and where said second configuration of said reflective element resolves said first ensemble of photons into two ensembles of photons with polarization vectors substantially different from the polarization vector of said first ensemble of photons;
and
where switching between said first and second configurations is substantially insensitive to the magnitude of said electronic signal.

2. A method for modifying the polarization vector of electromagnetic radiation, said method comprising:
generating a first ensemble of photons with a first polarization vector;
applying said first ensemble of photons to a reflective element with a dynamically configurable property;
generating an electronic signal which is applied to said reflective element with a dynamically configurable property, such that said electronic signal switches said reflective element between at least a first and a second configuration where said first configuration of said reflective element has substantially no effect on said first ensemble of photons and where said second configuration of said reflective element resolves said first ensemble of photons into two ensembles of photons with polarization vectors substantially different from the polarization vector of said first ensemble of photons;
and where switching between said first and second configurations is substantially insensitive to the magnitude of said electronic signal.

3. The method of claim 2, wherein the polarization vector of said electromagnetic radiation is a linear polarization vector.

4. The method of claim 2, wherein the dynamically configurable property of said reflective element is a dynamically configurable diffractive grating.

5. The method of claim 4, wherein the dynamically configurable property of said reflective element is a dynamically configurable diffractive grating that is induced in a conductive layer by an electronic signal.

6. The method of claim 2, wherein the dynamically configurable property of said reflective element is a dynamically configurable periodic perturbation.

7. The method of claim 6, wherein the dynamically configurable property of said reflective element is a dynamically configurable periodic perturbation formed by a periodic charge distribution induced in a non-conductive layer by an electronic signal.

8. The method of claim 2, wherein the dynamically configurable property of said reflective element is a dynamically configurable periodic perturbation magnetically induced.

9. The method of claim 2, wherein the dynamically configurable property of said reflective element is a dynamically configurable periodic perturbation induced by an optical interference signal.

10. A method of modulating electromagnetic radiation, comprising:
   directing polarized electromagnetic radiation through a polarized beam splitter to form a first ensemble of photons as incident radiation;
   applying said incident radiation to a reflective element with a dynamically configurable property;
   applying an electronic signal to said reflective element with a dynamically configurable property, such that said electronic signal switches said reflective element between at least a first and a second configuration where said first configuration of said reflective element has substantially no effect on said first ensemble of photons and where said second configuration of said reflective element resolves said first ensemble of photons as incident radiation into two second ensembles of photons, at least one of which is reflected by said reflective element to form reflected radiation;
   and wherein said reflected radiation has a polarization vector that is modulated by said electronic signal where the depth of modulation is substantially insensitive to the magnitude of said electronic signal;
   and wherein the component of said reflected radiation with a polarization vector different from the polarization vector of said incident radiation is redirected by said polarized beam splitter to form modulated radiation.

* * * * *